(12) United States Patent
Rho

(10) Patent No.: US 9,709,031 B2
(45) Date of Patent: Jul. 18, 2017

(54) TILT-TYPE ROTOR BLADE APPARATUS FOR VERTICAL TYPE WIND POWER GENERATION

(71) Applicant: KOREA. ROPAX, Gangwon-do (KR)

(72) Inventor: Young-gyu Rho, Jeollabuk-do (KR)

(73) Assignee: KOREA. ROPAX, Gangwon-Do (KR)

( * ) Notice: Subject to any disclaimer, the term of this patent is extended or adjusted under 35 U.S.C. 154(b) by 264 days.

(21) Appl. No.: 14/647,001

(22) PCT Filed: Nov. 21, 2013

(86) PCT No.: PCT/KR2013/010621
§ 371 (c)(1),
(2) Date: May 22, 2015

(87) PCT Pub. No.: WO2014/081219
PCT Pub. Date: May 30, 2014

(65) Prior Publication Data
US 2015/0308405 A1  Oct. 29, 2015

(30) Foreign Application Priority Data

Nov. 22, 2012  (KR) .......................... 10-2012-0132723

(51) Int. Cl.
*F03D 3/00* (2006.01)
*F03D 3/06* (2006.01)

(52) U.S. Cl.
CPC ............. *F03D 3/068* (2013.01); *F03D 3/005* (2013.01); *Y02E 10/74* (2013.01)

(58) Field of Classification Search
CPC ............. F03D 3/00; F03D 3/005; F03D 3/068
See application file for complete search history.

(56) References Cited

U.S. PATENT DOCUMENTS 2,052,454 A * 8/1936 Ellwood ............... B64C 11/343
                                                         416/136
4,374,631 A * 2/1983 Barnes ................... F03D 7/0252
                                                         416/23
(Continued)

FOREIGN PATENT DOCUMENTS

KR    10-2002-0023795 A    3/2002
KR    2002-0023795    *    3/2002    ............. F03D 3/068
(Continued)

OTHER PUBLICATIONS

International Search Report for PCT/KR2013/010621.
Written Opinion of International Searching Authority for PCT/KR2013/010621.

*Primary Examiner* — Woody Lee, Jr.
(74) *Attorney, Agent, or Firm* — The PL Law Group, PLLC

(57) ABSTRACT

Disclosed is a tilt-type rotation blade apparatus for vertical-type power generation. When a blade member is rotated in a backward direction to a wind direction, the blade member is tilted so that the blade plate is horizontal to the wind direction, thereby applying only the forward rotational force to the vertical power shaft, so that the wind power generation efficiency is maximized. A tilt structure is improved to smoothly perform a tilt operation and the structure of the blade member is improved so that the blade member is rotated in a vertical direction to the ground surface, thereby efficiently generating wind power without the limitation of an installation space.

10 Claims, 15 Drawing Sheets

(56) References Cited

U.S. PATENT DOCUMENTS 4,495,423 A * 1/1985 Rogers ..................... F01D 7/02
290/44
2014/0050583 A1* 2/2014 Wang ........................ F03D 3/00
416/98

FOREIGN PATENT DOCUMENTS

| KR | 10-1010428 B1 | 1/2011 | | |
|---|---|---|---|---|
| KR | 10-2011-0057301 A | 6/2011 | | |
| KR | 10-2011-0060774 A | 6/2011 | | |
| KR | 2011-0057301 | * | 6/2011 | ............. F03D 3/068 |

* cited by examiner

TILT-TYPE ROTOR BLADE APPARATUS FOR VERTICAL TYPE WIND POWER GENERATION

CROSS REFERENCE TO RELATED APPLICATIONS AND CLAIM OF PRIORITY

This patent application is a National Phase application under 35 U.S.C. §371 of International Application No. PCT/KR2013/010621, filed Nov. 21, 2013, which claims the priority based on KR 10-2012-0132723 filed Nov. 22, 2012, entire contents of which are incorporated herein by reference.

BACKGROUND OF THE INVENTION

1. Field of the Invention

The present invention relates to a tilt-type rotation blade apparatus for vertical-type power generation, capable of maximizing wind power generation efficiency.

2. Description of the Related Art

A power generation device may be classified into a horizontal-type power generation device having a rotation shaft installed horizontally to the ground surface, and a vertical-type power generation device installed vertically to the ground surface. When comparing with the horizontal-type power generation device, the vertical-type power generation device has advantages in that power can be generated regardless of wind direction, lower installation cost is required, and maintenance is more easily performed, but has a disadvantage in that power generation efficiency is degraded.

As shown in FIG. 15, one rotation blade a1 rotates in a forward direction the same as the direction of wind power to convert the energy of wind into rotational force of a rotation shaft b. An opposite rotation blade a2 rotates in a backward direction opposite to a wind direction W to serve as resistance, so that the conversion efficiency of energy may be degraded.

In order to solve the above problem, the present inventor acquires a patent right on a tilt-type rotation blade apparatus for a vertical-type power generation device (disclosed in Korean Patent Registration No. 10-1180832). According to the prior art, a blade plate of a blade member has a configuration to be tilted horizontally to the direction of wind when rotating in a backward direction and to be tilted vertically to the direction of wind when rotating in a forward direction, thereby minimizing the resistance due to the backward rotation of the blade member so that the power generation efficiency can be improved.

However, according to the prior art, a tilt structure includes a fixing gear, a rotating gear, and a pair of blade guiders, which represents a significantly complex structure. Accordingly, as the manufacturing cost is increased, the stable tilting operation may be difficult for a long time due to the damage or the breakdown to the gears, so that attention must be paid to the maintenance of the gears.

SUMMARY OF THE INVENTION

The present invention is made to solve the problem occurring in the related art, and an object of the present invention is to provide a tilt-type rotation blade apparatus for vertical-type wind power generation, capable of improving wind power generation efficiency by tilting a blade member, and being stably used for a long time without problems related to maintenance by improving a tilt structure simply constructed to stably perform a tilting operation.

In order to accomplish the above object, according to one aspect of the present invention, there is provided a tilt-type rotation blade apparatus for vertical-type power generation. The tilt-type rotation blade apparatus includes a vertical power shaft, a wind direction cooperation member installed independently from the vertical power shaft to rotate according to change of a wind direction, a tilt drum vertically fixed to the wind direction cooperation member and including a rail formed along a side-outer circumference thereof, a blade member including a blade stem and a blade plate to revolve around the tilt drum in a horizontal direction by wind power while applying rotational force to the vertical power shaft, and a tilt guider having one end fixed to a center of an end of the blade stem and an opposite end installed in the rail to move along the rail when the blade member revolves. The rail includes a forward rail part and a backward rail part having a linear shape, bi-directionally spaced apart from a revolution path of the blade member by an equal distance, alternately formed at an interval of 180°, and linked with each other by one pair of switching rail parts having an oblique shape, and the tilt guider moves along the forward rail part such that the blade plate becomes vertical to the wind direction when the blade member revolves in a forward direction of the blade member, which is identical to the wind direction, moves along the backward rail part such that the blade plate becomes horizontal to the wind direction when the blade member revolves in a backward direction, which is opposite to the wind direction, and passes through the switching rail parts to allow the blade member to self-rotate at an angle of 90° such that the blade plate is tilted vertically or horizontally to the wind direction.

In addition, according to another aspect of the present invention, there is provided a tilt-type rotation blade apparatus for vertical-type power generation. The tilt-type rotation blade apparatus includes a vertical power shaft, a wind direction cooperation member installed independently from the vertical power shaft to rotate according to change of a wind direction, a horizontal rotation shaft coupled to the vertical power shaft for power transmission and horizontally passing through the wind direction cooperation member, a tilt drum horizontally fixed to the wind direction cooperation member and including a rail formed along a side-outer circumference thereof, a blade member including a blade stem and a blade plate to revolve around the tilt drum in a vertical direction by wind power while applying rotational force to the horizontal power shaft, and a tilt guider having one end fixed to a center of an end of the blade stem and an opposite end installed in the rail to move along a track of the rail when the blade member revolves. The rail includes a forward rail part and a backward rail part having a linear shape, bi-directionally spaced apart from a revolution path of the blade member by an equal distance, alternately formed at an interval of 180°, and linked with each other by one pair of switching rail parts having an oblique shape, and the tilt guider moves along the forward rail part such that the blade plate becomes vertical to the wind direction when the blade member revolves in a forward direction of the blade member, which is identical to the wind direction, moves along the backward rail part such that the blade plate becomes horizontal to the wind direction when the blade member revolves in a backward direction, which is opposite to the wind direction, and passes through the switching rail parts to allow the blade member to self-rotate at an angle of 90° such that the blade plate is tilted vertically or horizontally to the wind direction.

According to still another aspect of the present invention, there is provided a tilt-type rotation blade apparatus for vertical-type power generation, which applies rotational force generated by wind power to a vertical power shaft of a vertical wind power turbine. The rotation blade apparatus includes a horizontal rotation shaft geared with the vertical power shaft and having a shaft line vertical to a wind direction and horizontal to a ground surface, a blade member including a blade stem self-rotatably installed on the horizontal rotation shaft and a blade plate fixed to the blade stem to revolve around the horizontal rotation shaft by wind blowing from a front side such that the rotational force is applied to the horizontal rotation shaft, a guider member including a forward guider formed on the blade stem to protrude in a horizontal direction to a plane surface of the blade plate and a backward guider protruding in a vertical direction to the plane surface of the blade plate, and a blade tilt member including a forward rail groove into which the forward guider is inserted such that the forward guider is guided along the forward rail groove when the blade member revolves in a forward direction, which is identical to the wind direction, from a front side to a rear side, a backward rail groove into which the backward guider is inserted such that the backward guider is guided when the blade member revolves in a backward direction, which is opposite to the wind direction, from a rear side to the front side, and rotation induction inclination parts formed at a rear position of the forward rail groove and at a front portion of the backward rail groove, respectively, to induce rotations of the forward guider and the backward guider, which are guided, and to allow the blade member to revolve at an angle of 90°, such that the plane surface of the blade plate becomes vertical to the wind direction when the blade member revolves in the forward direction, and becomes horizontal to the wind direction when the blade member revolves in the backward direction.

As described above, according to the tilt-type rotation blade apparatus for the vertical-type power generation, the wind power generation efficiency can be enhanced by applying only the forward rotational force, which is generated by wind power, to the vertical power shaft through the tilt operation of the blade member. Particularly, since the blade member performs the tilting operation only by a single tilt guider moving along the rail different from the gearing scheme according to the related art, the blade member has a simple structure so that the manufacturing cost can be saved and the tilting operation of the blade member can be stably and smoothly performed for a long time.

In addition, since the blade member has a structure to rotate in the vertical direction to the ground surface, the installation radius of the blade member about the vertical power shaft can be significantly reduced, so that the blade member can be easily installed without the limitation of the installation space.

DETAILED DESCRIPTION OF THE INVENTION

Figure 1:
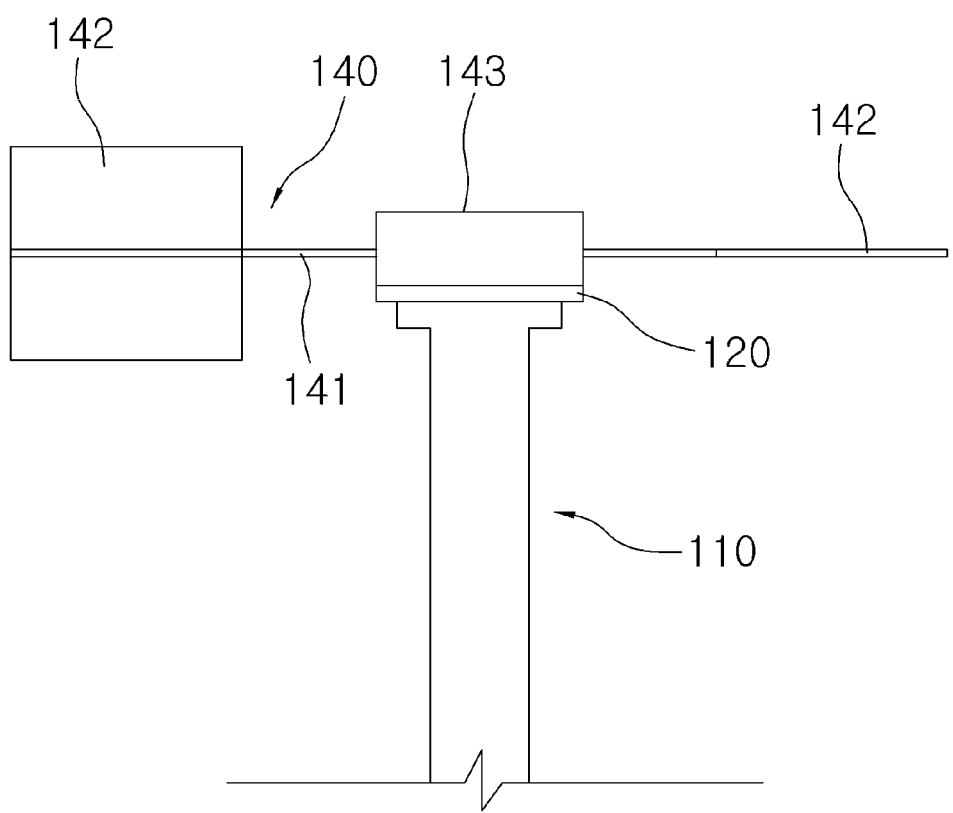
FIG. 1 is a plan view showing a whole structure according to a first embodiment.

Hereinafter, an exemplary embodiment of the present invention will be described in detail.

Regarding the terminology used in the specification, the term "self-rotation" refers to that a blade member rotates about a blade stem regardless of a rotation shaft, and the term "revolution" that the blade member rotates about the rotation shaft.

In addition, the term "forward direction" refers to the same direction as wind direction, and the term "backward direction" refers to a direction opposite to the wind direction. Accordingly, the term "forward revolution" refers to that the blade member rotates at an angle in the range of 0° to 180°, and the term "backward revolution" refers to that the blade member rotates in the backward direction opposite to the wind direction at an angle in the range of 180° to 360° (or 0°).

FIGS. 1 to 5 are views showing a first embodiment of the present invention. A tilt-type rotation blade apparatus 100 for vertical-type power generation according to the first embodiment includes a vertical power shaft 110, a wind direction cooperation member 120, a tilt drum 130, a blade member 140, and a tilt guider 150.

The vertical power shaft 110 serves as a rotation shaft installed vertically to the ground surface, and connected with a power generator (not shown) through a power transmission unit. Accordingly, those skilled in the art can sufficiently understand that the rotational power of the vertical power shaft 110 generated by wind power is applied to the power generator to produce electricity.

The wind direction cooperation member 120 is installed independently from the vertical power shaft 110 to freely rotate in cooperation with the wind direction regardless of the vertical power shaft 110. A wind direction indication member (not shown) may be installed in the wind direction cooperation member 120 to provide the rotational force to the wind direction cooperation member 120 according to the change of the wind direction. Since the configuration and the operation of the wind direction indication member are generally known in the prior art in detail, the details of the wind direction indication member will be omitted.

Figure 2:
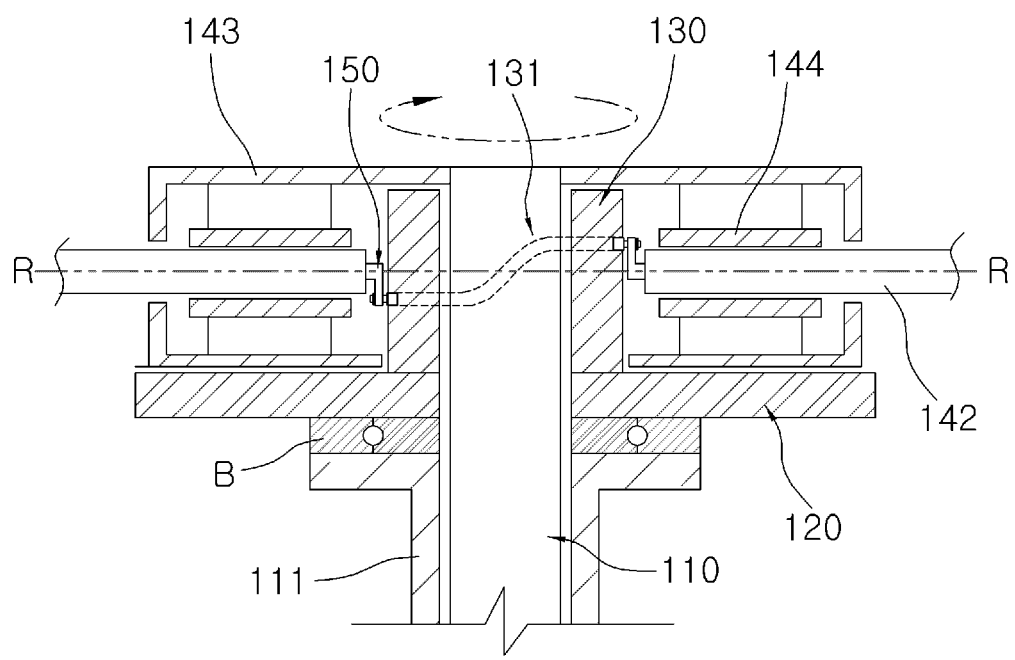
FIG. 2 is a sectional view of FIG. 1.

In addition, as shown in FIG. 2, the wind direction cooperation member 120 may be coupled to a support structure 111 provided at an outside of the vertical power shaft 110 through a support bearing B, such as a swing bearing, to freely rotate regardless of the vertical power shaft 110.

The tilt drum 130 interacts with the tilt guider 150 to allow the blade member 140, which revolves, to self-rotate so that a blade plate 142 becomes in a vertical state to the wind direction when the blade member 140 revolves in the forward direction, and becomes in a horizontal state to the wind direction when the blade member 140 revolves in the backward direction.

As shown in FIG. 2, the tilt drum 130 has the center through which the vertical power shaft 110 passes, and is fixed to the wind direction cooperation member 120 vertically to the wind direction cooperation member 120. Accordingly, the tilt drum 130 rotates together with the wind direction cooperation member 120 regardless of the rotation of the vertical power shaft 110 when the wind direction cooperation member 120 rotates according to the changes of the wind direction.

Figure 3:
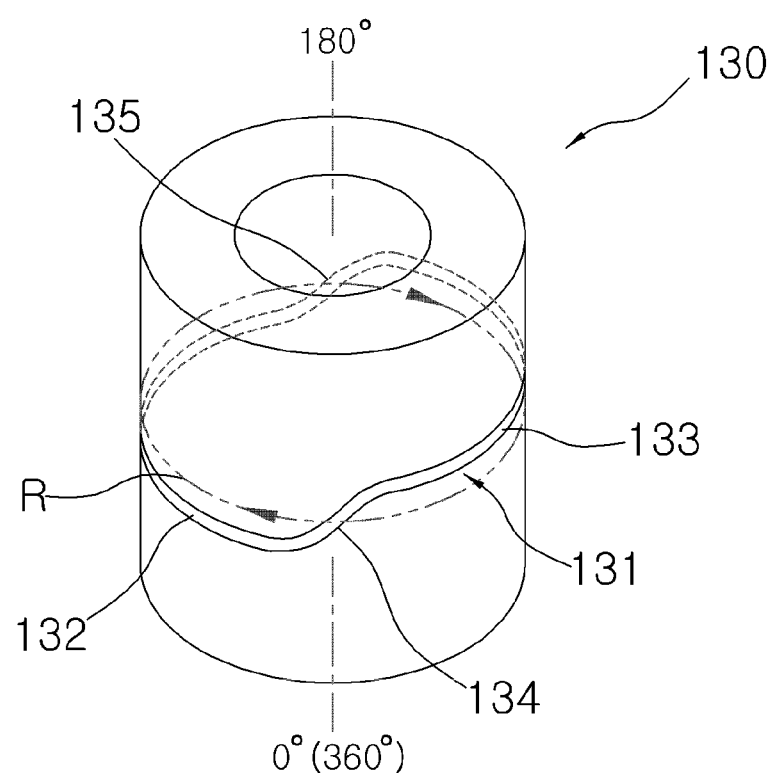
FIG. 3 is a view showing a tilt drum according to the first embodiment.

A rail 131 is formed in a side-outer circumference of the tilt drum 130 to guide the tilt guider 150. As shown in FIG. 3, the rail 131 forms a closed rail consecutively extending while surrounding at 360° along the side-outer circumference of the tilt drum 130, and includes a forward rail part 132, a backward rail part 133, and a pair of switching rail parts 134 and 135.

Figure 5:
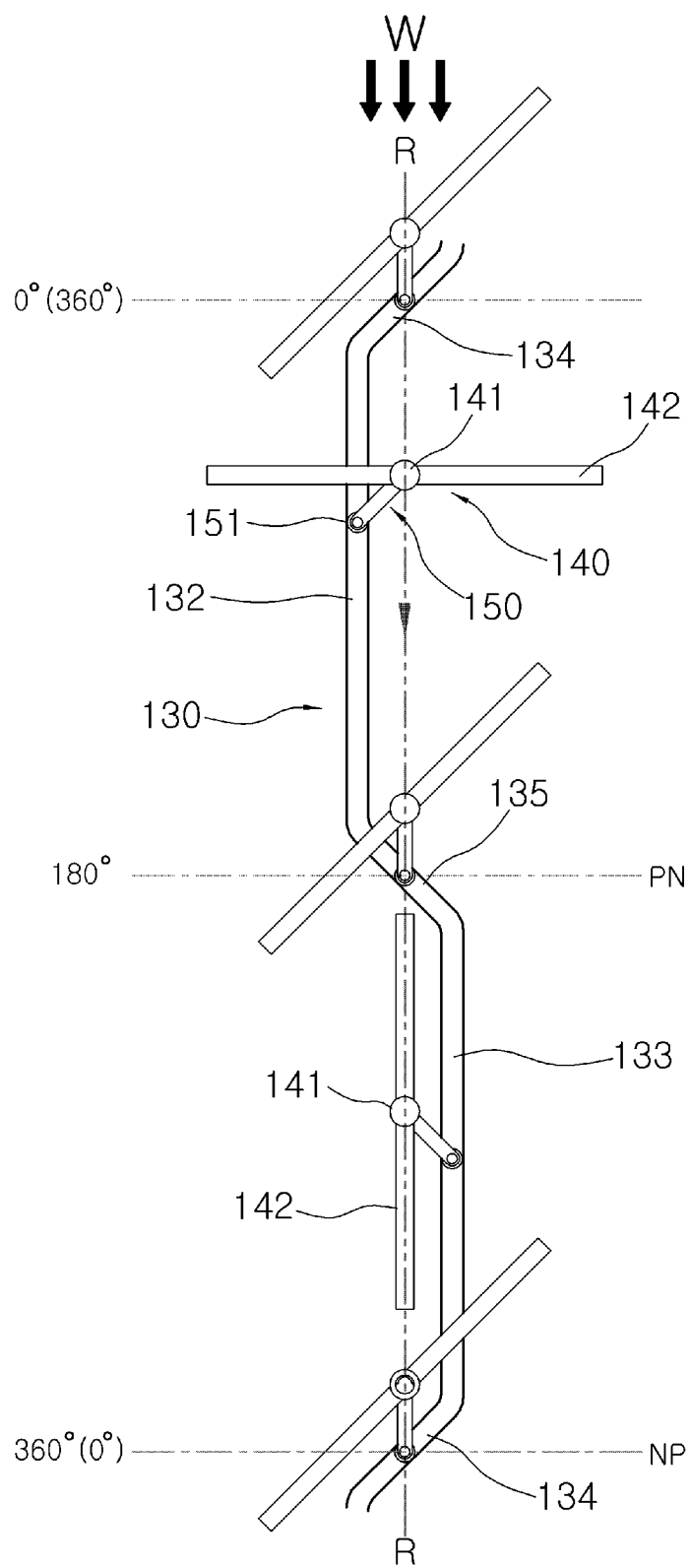
FIG. 5 is a view showing the revolution of the blade member according to the first embodiment.

FIG. 5 is a view showing the rail 131 when the tilt drum 130 is developed for the convenience of explanation. The forward and backward rail parts 132 and 133 have a linear shape and alternates with each other at an interval of 180°

Particular, the forward rail part 132 and the backward rail part 133 are bi-directionally spaced apart from a revolution path R of the blade member by an equal distance. The switching rail parts 134 and 135 connect the forward rail part 132 with the backward rail part 133 at both end portions of each of the forward and backward rail parts 132 and 133.

In this case, the blade member 140 revolves around the tilt drum 130 along the revolution path R. The revolution of the blade member 140 is changed from the forward revolution to the backward revolution or from the backward revolution to the forward revolution at every revolution angle of 180° according to wind directions W.

Accordingly, the forward rail part 132 is formed within a forward revolution angle range of 0° to 180°, and the backward rail part 133 is formed within a backward revolution angle range of 180° to 360° (or 0°). The switching rail parts 134 and 135 are formed in an oblique line shape while being symmetrical to each other at positions where the revolution angles are 0° (or 360°) and 180° to connect the forward rail part 132 with the backward rail part 133.

In this case, when a point, at which the direction of the blade member 140 is changed from the forward direction to the backward direction, is referred to as a forward-backward change point (PN), and a point, at which the direction of the blade member 140 is changed from the backward direction to the forward direction, is referred to as a backward-forward change point (NP), the switching rail parts 134 serve as the backward-forward change point (NP), at which the backward rail part 133 is linked with the forward rail part 132, at the position of 0° (or 360°), and the forward-backward change point (PN), at which the forward rail part 132 is linked with the backward rail part 133, at the position of 180°, respectively.

Figure 4:
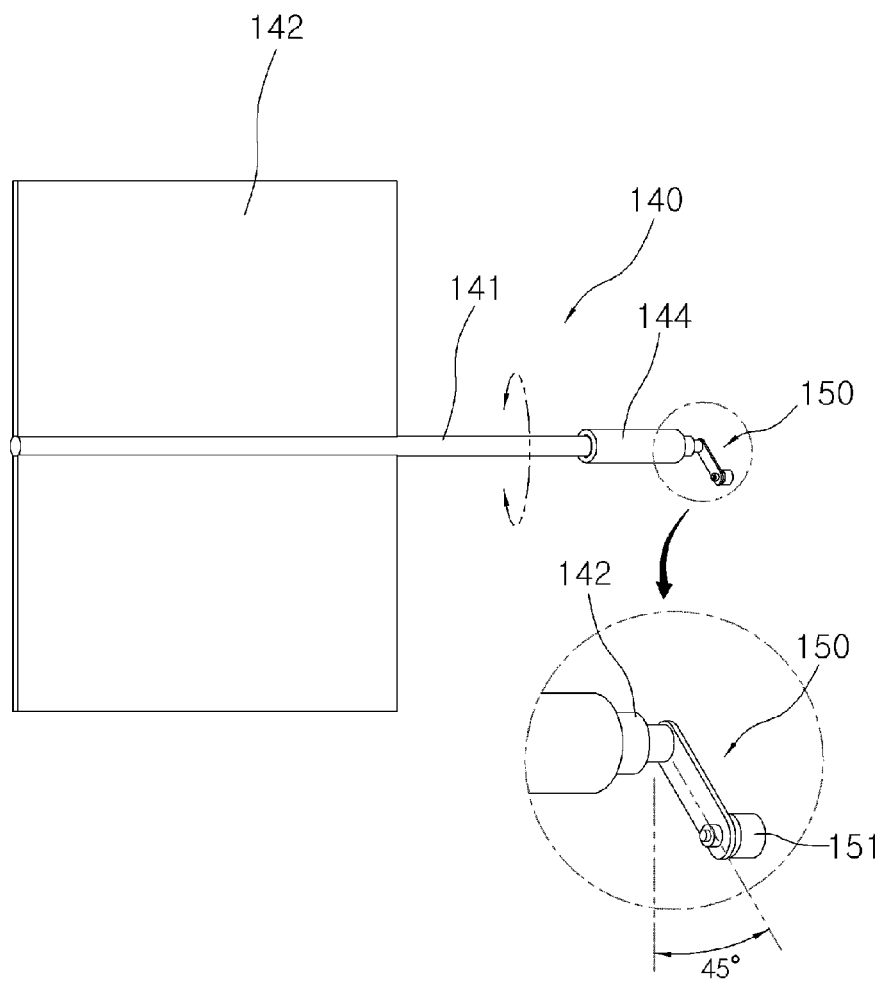
FIG. 4 is a view showing a blade member and a tilt guider according to the first embodiment.

The blade member 140 applies the rotational force generated by the wind power to the vertical power shaft 110, and includes a blade stem 141 having a predetermined length and the blade plate 142 fixed with a predetermined width to the blade stem 141 as shown in FIG. 4.

The blade member 140 revolves around the tilt drum 130 at the angle of 360° horizontally to the ground surface while applying the rotational power to the vertical power shaft 110, and self-rotates.

To this end, as shown in FIG. 2, a blade support member 143 is fixedly installed on the vertical power shaft 110, and a stem support pipe 144 is provided in the blade support member 143 so that the blade stem 141 is installed through the stem support pipe 144. Accordingly, when the blade member 140 revolves, the blade support member 143 and the vertical power shaft 110 rotate together so that the blade stem 141, which is supported through the stem support pipe 144, can self-rotate.

The blade member 140 applies the maximum rotational force to the vertical power shaft 110 by the wind power when the blade plate 142 is vertical to the wind, and applies the minimum rotational force to the vertical power shaft 110 by the wind power when the blade plate 142 is horizontal to the wind.

A plurality of blade members 140 may be installed at an interval of a predetermined angle. Although two blade members 140 are installed for the illustrative purpose in accompanying drawings, three blade members 140 may be installed at an interval of 120° or four blade members 140 may be installed at the interval of 90°.

Since the tilt guider 150 moves along the rail 131 of the tilt drum 130 while tilting the blade member 140 when the blade member 140 revolves, one end of the tilt guider 150 is fixed to the center of an end of the blade stem 141 to extend while forming an angle of 45° with respect to the blade plate 142, and an opposite end of the extending tilt guider 150 is installed in the rail 131 as shown in FIG. 4.

In addition, a rail roller 151 may be provided at the opposite end of the tilt guider 150 installed in the rail 131, so that the tilt guider 150 may smoothly move along the rail 131.

Through the above configuration, as shown in FIG. 5, when the blade member 140 revolves in the forward direction, the tilt guider 150 moves along the forward rail part 132 of the rail 131 and the blade plate 132 is maintained in the vertical state to the wind direction W while the blade member 140 revolves. Then, when the tilt guider 150 passes through the switching rail part 135 at the position of 180° which is the forward-backward change point (PN), the tilt guider 150 tilts the blade plate 142 by revolving the blade stem 141 at the angle of 90° so that the blade plate 142 becomes in a horizontal state to the wind direction W.

Thereafter, when the blade member 140 revolves in the backward direction, the tilt guider 150 moves along the backward rail part 133 and the blade plate 142 is maintained in the horizontal state to the wind direction W while the blade member 140 revolves. Then, when the tilt guider 150 passes through the switching rail part 134 at the position of 360° (or 0°) which is the backward-forward change point (NP), the tilt guider 150 tilts the blade plate 142 by revolving the blade stem 141 at the angle of 90° so that the blade plate 142 becomes in the vertical state to the wind direction W.

Figure 6:
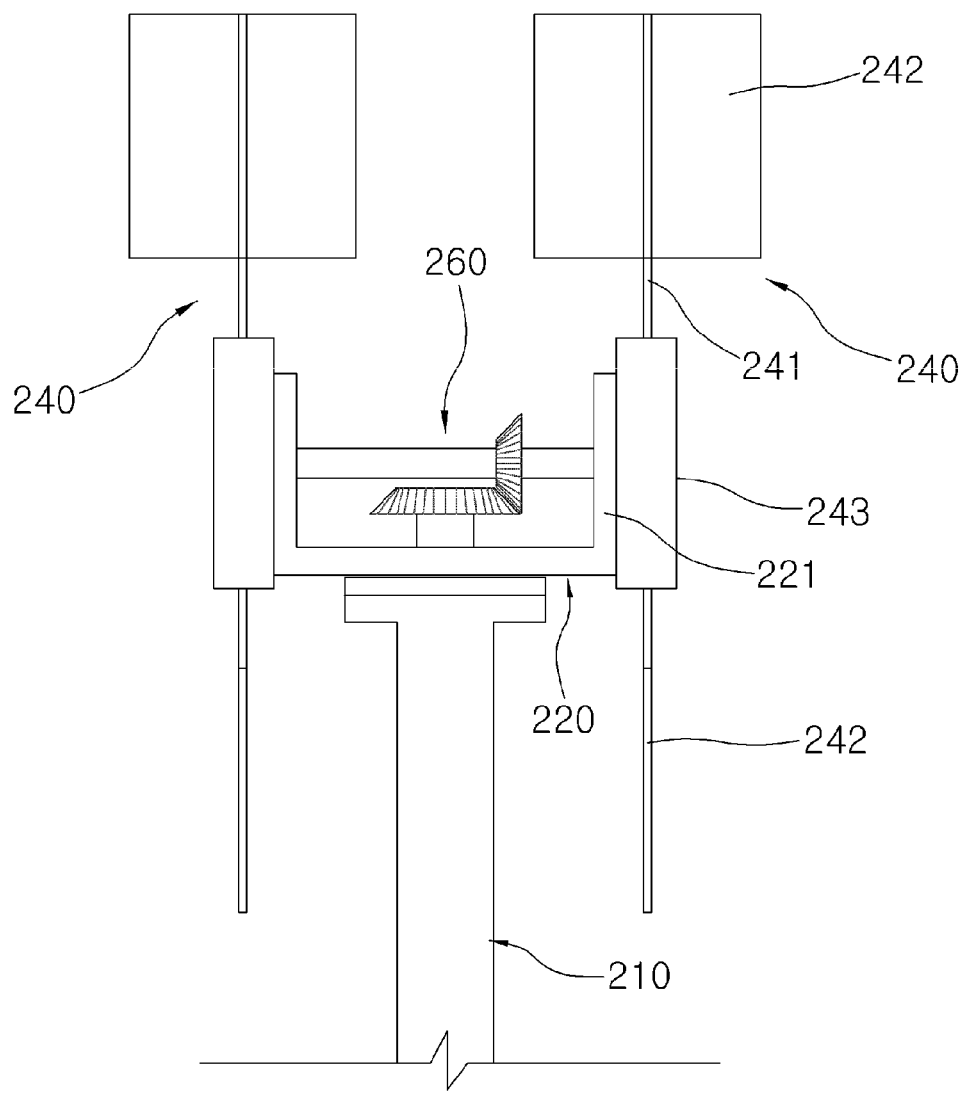
FIG. 6 is a font view showing a whole structure according to a second embodiment.
Figure 7:
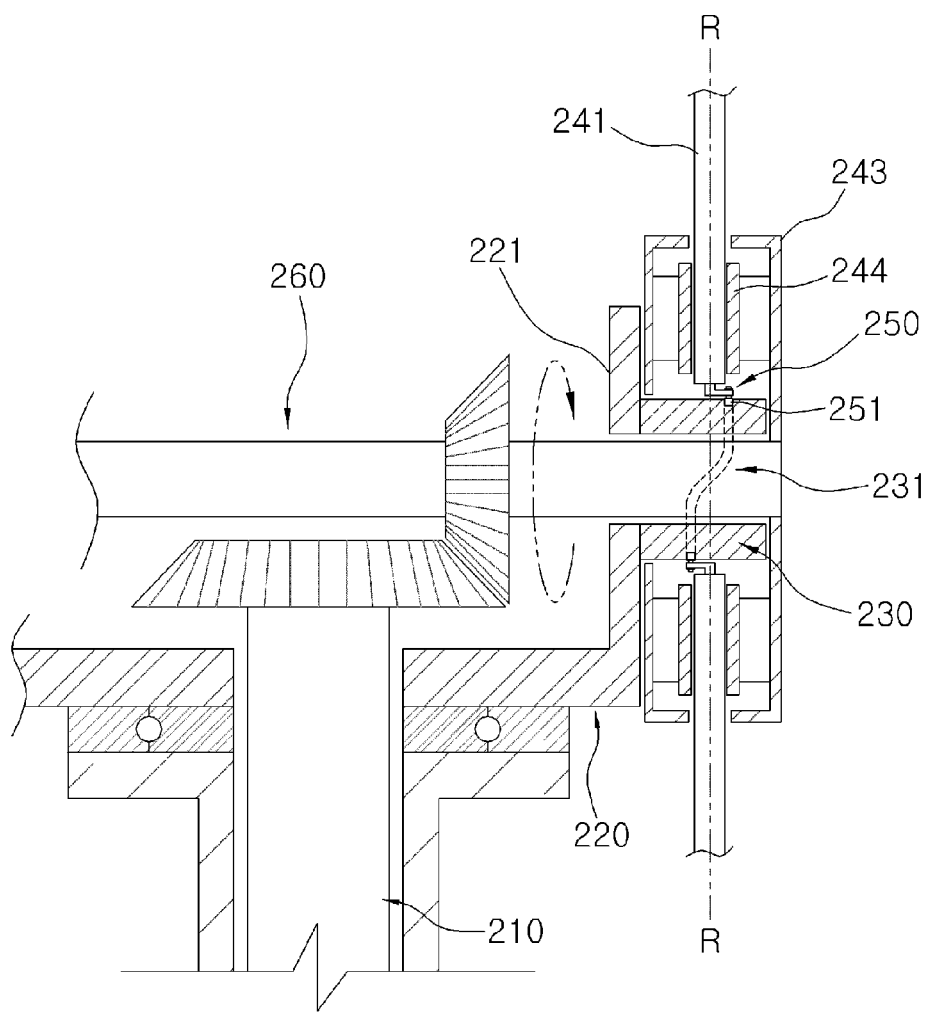
FIG. 7 is a sectional view of FIG. 6.
Figure 8:
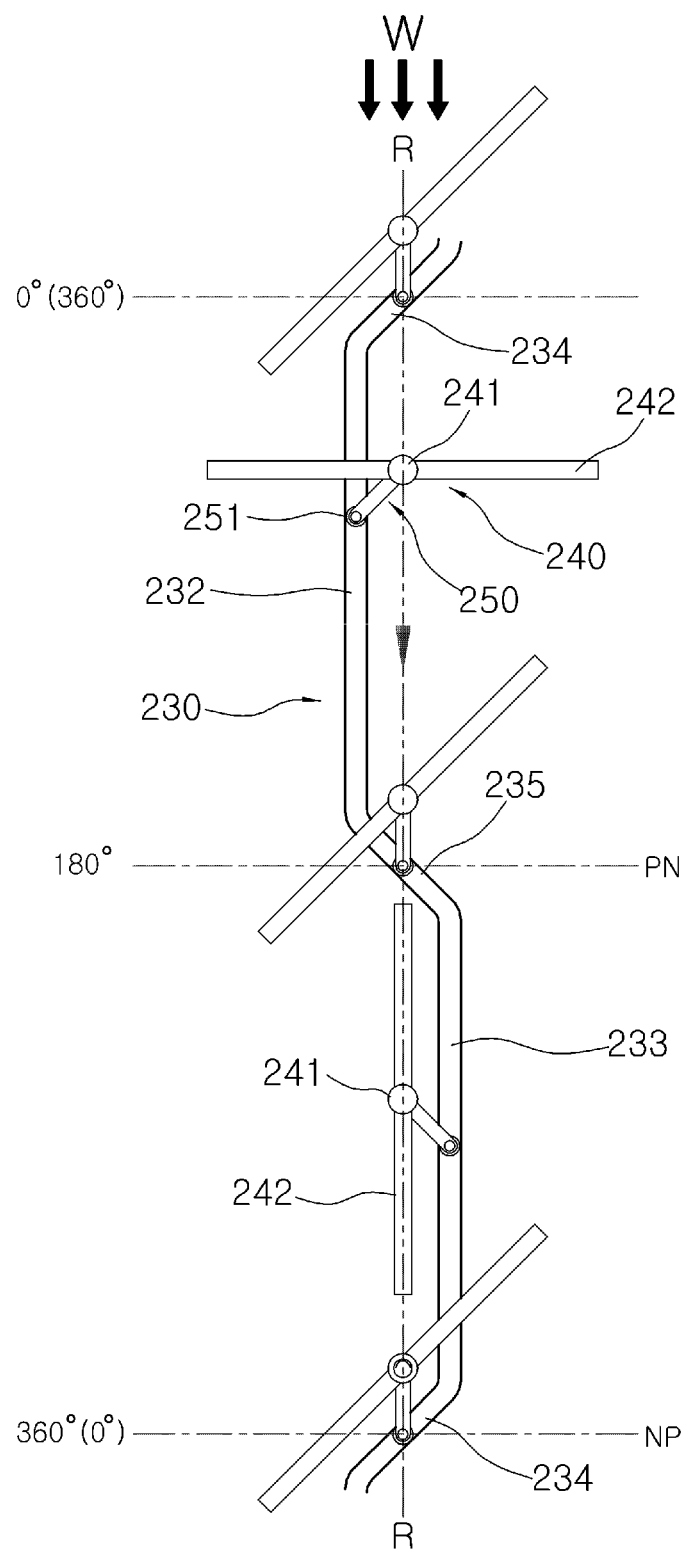
FIG. 8 is a view showing the revolution of the blade member according to the second embodiment.

FIGS. 6 to 8 are views showing a second embodiment of the present invention. A tilt-type rotation blade apparatus 200 for vertical-type power generation according to the second embodiment is identical to the above-described tilt-type rotation blade apparatus according to the first embodiment except that the tilt-type rotation blade apparatus 200 further include a horizontal rotation shaft 260 and a blade member 240 has a structure of revolving around the horizontal rotation shaft 260 in a vertical direction to the ground surface.

In the following description with reference to the second embodiment, the details of the structure and the components the same as those of the first embodiment will be omitted.

First, a vertical power shaft 210 is installed in the vertical direction to the ground surface, and a wind direction cooperation member 220 is installed independently from the vertical power shaft 210 so that the wind direction cooperation member 220 operates according to the change of the wind direction.

In this case, the wind direction cooperation member 220 must be further provided therein with the horizontal rotation shaft 260 supported by the wind direction cooperation member 220 and a tilt drum 230 installed in a horizontal direction. To this end, the wind direction cooperation member 220 is provided at both ends thereof with shaft support parts 221 to rotatably support the horizontal rotation shaft 260 while the tilt drum 230 is fixedly installed.

The horizontal rotation shaft 260 is installed in the horizontal direction through the shaft support parts 221 of the wind direction cooperation member 220. As the horizontal rotation shaft 260 is installed in the wind direction cooperation member 220, so that the horizontal rotation shaft 260 cooperates with the wind direction cooperation member 220 while a shaft line of the horizontal rotation shaft 260 can be maintained in the vertical state even if the wind direction W is changed.

The horizontal rotation shaft 260 is coupled to the vertical power shaft 210 to transmit power so that the rotational force can be transmitted to the vertical power shaft 210. As shown in FIG. 7, the horizontal rotation shaft 260 may be coupled to the vertical power shaft 210 through a bevel gear.

The tilt drum 230 has a structure in which a rail 231 including a forward rail part 232, a backward rail part 233, and a pair of switching rail parts 234 and 235 is formed along a side-outer circumference of the tilt drum 230. As shown in FIG. 7, the horizontal rotation shaft 260 passes through the center of the tilt drum 230 instead of the vertical power shaft 210, so that the tilt drum 230 is fixed to the shaft support parts 221 of the wind direction cooperation member 220 in the horizontal direction.

The blade member 240 includes a blade stem 241 and a blade plate 242. As shown in FIG. 7, the blade member 240 is self-rotatably installed on a stem support pipe 244 of a blade support member 243, which is installed on the horizontal rotation shaft 260, instead of the vertical power shaft 210.

Accordingly, the blade member 240 revolves in the vertical direction to the ground surface while applying the rotational force to the horizontal rotation shaft 260. The rotational force of the horizontal rotation shaft 260 is transmitted to the vertical power shaft 210.

A tilt guider 250 has the same configuration as that of the first embodiment. In other words, one end of the tilt guider 250 is fixed to the center of an end of the blade stem 241 to extend while forming an angle of 45° with respect to the blade plate 242, and an opposite end of the extending tilt guider 250 is installed in the rail 231 of the tilt drum 230.

The tilt drum 230 and the tilt guider 250 have the same operations as those of the first embodiment although the installation directions of the tilt drum 230 and the tilt guider 250 are different from those of the first embodiment.

As shown in FIG. 8, when the blade member 240 revolves in the forward direction to the wind direction W, the tilt guider 250 moves along a forward rail part 232 of the rail 231 and the blade plate 242 is maintained in the vertical state to the wind direction W while the blade member 240 revolves. When the blade member 240 revolves in the backward direction to the wind direction W, the tilt guider 250 moves along a backward rail part 233 and the blade plate 242 is maintained in the horizontal state while the blade member 240 revolves. Then, when the tilt guider 250 passes through a switching rail part 234 provided at the position of 360° (or 0°) which is the backward-forward change point (NP) and a switching rail part 235 provided at the position of 180° which is the forward-backward change part (PN), the tilt guider 250 tilts the blade plate 242 by revolving the blade stem 241 by the angle of 90° so that the blade plate 242 becomes in the vertical state or the horizontal direction to the wind direction W.

According to the second embodiment, since the blade member 240 rotates in the vertical direction to the ground surface, the installation space of the blade member 240 can be significantly reduced when comparing with that of the first embodiment. As shown in FIG. 6, a pair of components may be installed at both sides of the horizontal rotation shaft 260 to apply the rotational force. Accordingly, greater rotational force can be transmitted to the vertical power shaft 210.

The first and second embodiments have been described, and the operations thereof will be described below.

In this case, the operations will be described while focusing on the second embodiment with reference to FIG. 8 for the convenience of explanation because the first and second embodiments have the same operation relationships although the difference between the first and second embodiments is made in the revolution direction of the blade member 240.

When the blade member 240 revolves around the tilt drum 230 in the vertical direction to the ground surface while revolving in the forward direction from the angle of 0° to the angle of 180° to the wind direction W, the tilt guider 250 moves along the forward rail part 232 formed in the linear shape at one side of the revolution path R. Accordingly, the blade plate 242 is maintained in the vertical state to the wind direction W, so that the blade member 240 applies the maximum forward rotational force generated by the wind power to the horizontal rotation shaft 260 while revolving in the forward direction.

In addition, when the blade member 240 arrives at the vicinity of the position at which the revolution angle is 180°, the tilt guider 250 passes through the switching rail part 235 serving as the forward-backward change point (PN) and having the oblique shape while the direction of the tilt guider 250 is changed from the forward rail part 232 to the backward rail part 233. Accordingly, the blade stem 141 revolves at the angle of 90° while the blade plate 242 is tilted in the horizontal direction to the wind direction W.

In addition, after the blade plate 242 has been tilted, the blade member 240 revolves in the backward direction while ranging from the revolution angle of 180° to the revolution angle of 360° (or 0°) to the wind direction W, the tilt guider 250 moves along the backward rail part 233, which has the linear shape, at an opposite side of the revolution path R. Accordingly, the blade plate 242 is maintained in the horizontal state to the wind direction W, so that the blade member 240 minimizes the backward rotational force applied to the horizontal rotation shaft 260 while revolving in the backward direction.

In addition, when the blade member 240 arrives at the vicinity of the position at which the revolution angle is 180° and the backward direction is changed to the forward direction, the tilt guider 250 passes through the switching rail part 235 serving as the backward-forward change point (NP) and having the oblique shape while the direction of the tilt guider 250 is changed from the backward rail part 233 to the forward rail part 232. Accordingly, the blade stem 141 revolves at the angle of 90° while the blade plate 242 is tilted in the vertical direction to the wind direction W.

Further, after the blade member 240 has been tilted while the direction of the blade member 240 is changed to the forward direction, the forward and backward revolutions and the tilting process are repeated as described above, so that the blade member 240 can apply only the maximum forward rotational force to the horizontal rotation shaft 260. The forward rotational force applied to the horizontal rotation shaft 260 is transmitted to the vertical power shaft 210 geared with the horizontal rotation shaft 260, so that the energy conversion efficiency can be improved.

FIGS. 9 to 14 are views according to the third embodiment. A tilt-type rotation blade apparatus according to the third embodiment may include a horizontal rotation shaft 310, a blade member 320, a guider member 330, and a blade tilt member 340.

The horizontal rotation shaft 310 is coupled to a vertical power shaft 350 of a wind power turbine through a gear. A shaft body 311 having a diameter greater than that of the horizontal rotation shaft 310 may be formed at an end of the horizontal rotation shaft 310 for the installation of the blade member 320.

The blade member 320 includes a blade stem 321 installed with a predetermined length in the shaft body 311, a blade plate 322 fixed to a rear end of the blade stem 321, and a blade head 323 formed at a front end of the blade stem 321.

The shaft body 311 is provided therein with a revolution space part 312 and a stem through hole 313 extending from the revolution space part 312 to allow the shaft body 311 to pass therethrough. The blade head 323 is received in the revolution space part 312 of the shaft body 311 so that the revolution operation is possible. The blade stem 321 extends out of the shaft body 311 through the stem through hole 313.

According to the installation structure, the blade member 320 can self-rotate regardless of the rotation of the horizontal rotation shaft 310. In addition, when the blade member 320 revolves by wind power, the horizontal rotation shaft 310 is rotated together with the blade member 320, so that the rotational force can be applied to the horizontal rotation shaft 310.

The guider member 330 interacts with the blade tilt member 340 to tilt the blade member 320. The guider member 330 includes a forward guider 331 and a backward guider 332, each of the forward and backward guiders 331 and 332 protruding from the blade stem 321 by a predetermined length.

The forward guider 331, which protrudes in a horizontal direction with respect to a plane surface of the blade plate 322, is inserted into the blade tilt member 340 when the blade member 320 revolves in the forward direction, thereby controlling the self-rotation of the blade stem 321 when the blade plate 322 is in the vertical state to the wind direction W. The back guider 332, which protrudes in the vertical direction with respect to the plane of the blade plate 322, is inserted into the blade tilt member 340, thereby controlling the self-rotation of the blade stem 321 when the blade plate 322 is in the horizontal state to the wind direction W.

The blade tilt member 340 interacts with the guider member to allow the blade member 320, which revolves, to self-rotate. Accordingly, the horizontal rotation shaft 310 passes through the blade tilt member 340 and the blade tilt member 340 is provided at one side of the shaft body 311 to include a forward rail groove 341, a backward rail groove 342, a rotation induction inclination part 343, and a rotational application inclination part 344.

Figure 11:
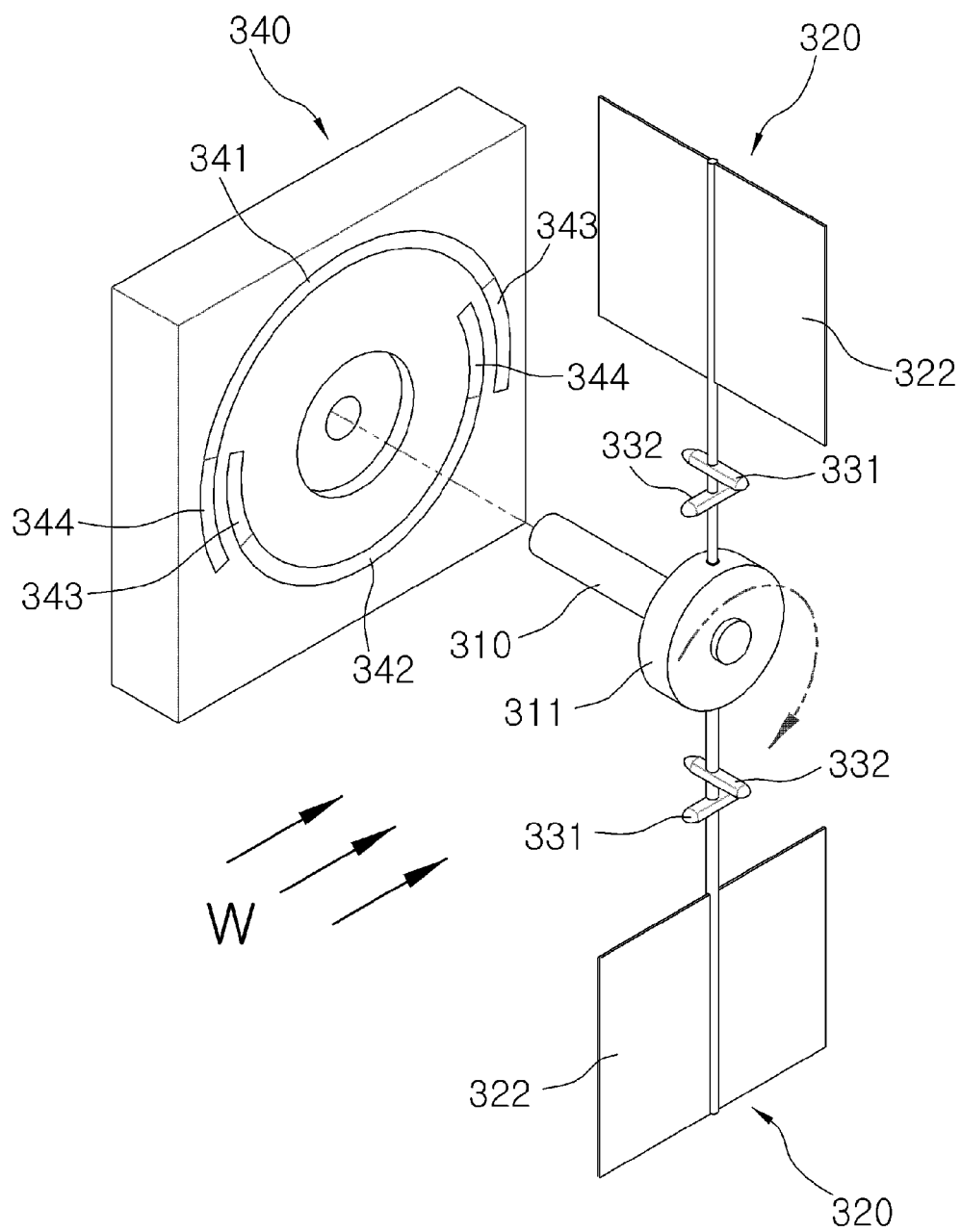
FIG. 11 is an exploded perspective view showing the blade member and the blade tilt member.
Figure 12:
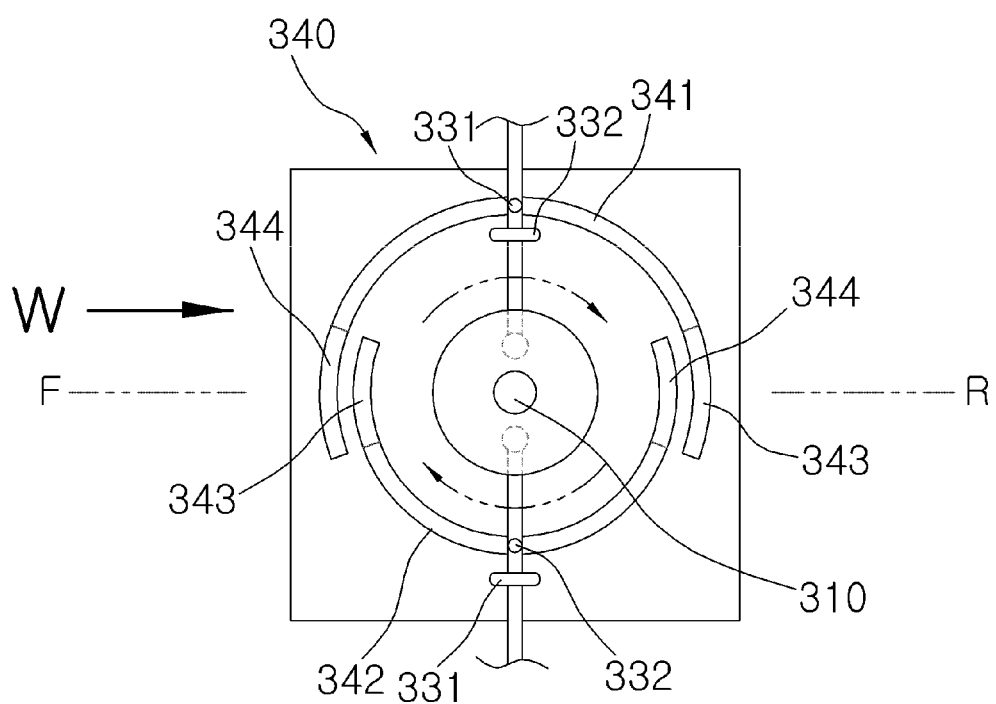
FIG. 12 is a perspective view showing a shaft body of the blade member.
Figure 13:
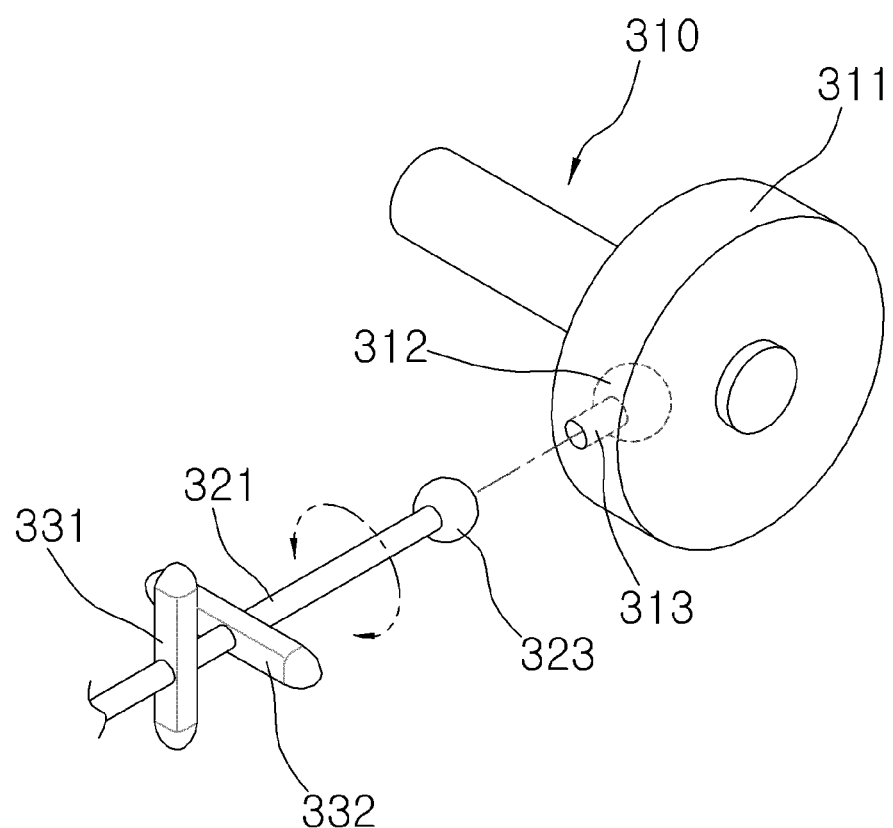
FIG. 13 is a side view showing the blade tilt member.

The forward rail groove 341 and the backward rail groove 342 are recessed in the blade tilt member 340 by a predetermined depth. As shown in FIGS. 11 and 12, each of the forward and backward rail grooves 341 and 342 is formed in an arc shape. The forward rail groove 341 is formed above the horizontal rotation shaft 319, and the backward rail groove 341 is formed under the backward rail groove 342.

In addition, the forward and backward rail grooves 341 and 342 are concentrically formed symmetrically to each other about the horizontal rotation shaft 310. Front and rear portions F and R of the forward rail groove 341 are overlapped with front and rear portions F and R of the backward rail groove 342.

The forward rail groove 341 and the backward rail groove 342 selectively guide the forward guider 331 and the backward guider 332 of the guider member 330, respectively. Accordingly, when the blade member 320 revolves in the forward direction, the forward guider 331 is inserted into the forward rail groove 341 and guided along the forward rail groove 341, and, when the blade member 320 revolves in the backward direction, the backward guider 332 is inserted into the backward rail groove 342 and guided along the backward rail groove 342.

The rotation induction inclination part 343 induces the rotation of the forward guider 331 and the rotation of the backward guider 332 so that the blade member 320 revolves at an angle of 90°.

The rotation induction inclination part 343 is formed in each of the forward rail groove 341 and the backward rail groove 342. In detail, the rotation induction inclination part 343 is formed at the rear portion R of the forward rail groove 341 overlapped with the backward rail groove 342, and formed at the front portion F of the backward rail groove 342 overlapped with the forward rail groove 341.

The rotation induction inclination part 343 may be inclined in a streamline shape upward from a bottom surface of the forward rail groove 341 or the backward rail groove 342 to the surface of the blade tilt member 340. A locking step 343a may be formed in the shape of a protrusion at a lower end of the rotation induction inclination part 343 meeting the bottom surface as shown in FIG. 14.

Figure 14:
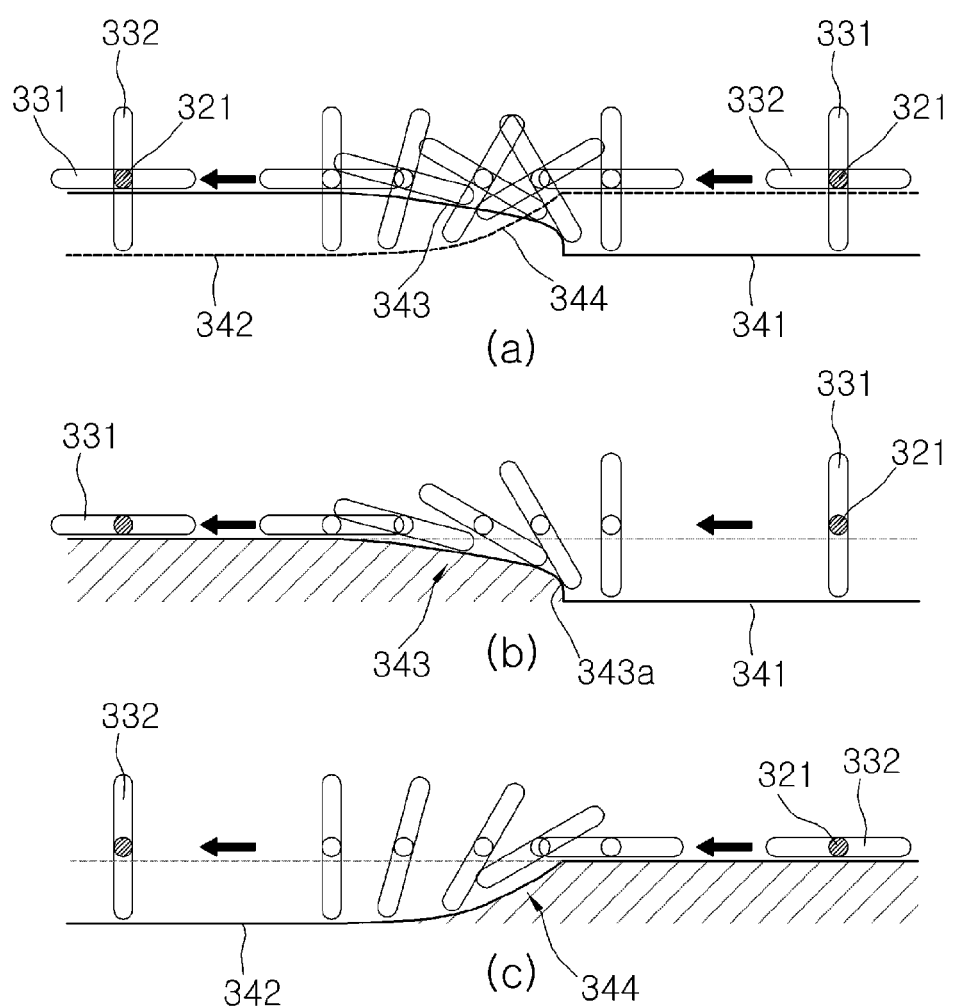
FIG. 14 illustrates sectional views of the guider member in the rotation operation.
Figure 15:
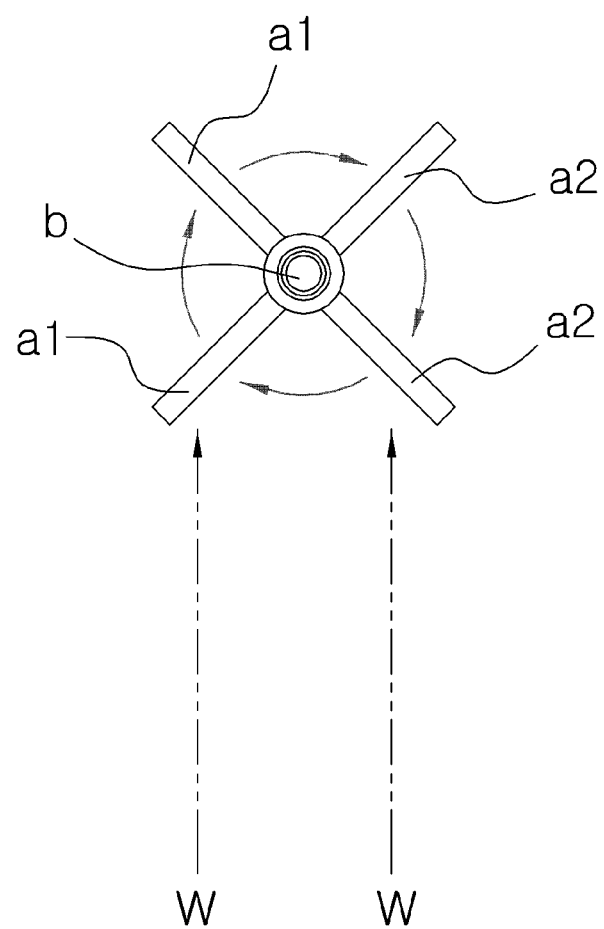
FIG. 15 is a view showing the rotation of a blade in a typical vertical-type wind power turbine according to the related art.

Through the above configuration, as shown in FIG. 14, if the forward guider 331 guided along the forward rail groove 341 reaches the rotation induction inclination part 343, which is provided at the rear portion R of the forward rail groove 341, due to the forward revolution, the forward guider 331 is locked to the locking step 343a, so that the rotation of the forward guider 331 is induced. Subsequently, the forward guider 331 moves along the surface inclined upward while rotating, and deviates from the rotation induction inclination part 343. In this case, the forward guider 331 is rotated at 90°. Accordingly, as even the blade member 320 is revolved at 90°, the tilting state of the blade plate 322 is changed from the vertical state with respect to the wind direction W toward the horizontal state with respect to the wind direction W.

On the contrary, identically to the forward guider 331, the backward guider 332 guided along the backward rail groove 342 is rotated at 90° while passing through the rotation induction inclination part 343 provided at the front portion F of the backward rail groove 342 due to the backward revolution. Accordingly, as even the blade member 320 is revolved at 90°, the tilting state of the blade plate 322 is changed from the horizontal state with respect to the wind direction W to the vertical state with respect to the wind direction W.

When the forward guider 331 or the backward guider 332 is rotated by the rotation induction inclination part 343, the rotation application inclination part 344 rotates the corresponding backward guider 322 or the corresponding forward guider 331 together with the forward guider 331 or the backward guider 322. The rotation induction inclination part 343 is formed in opposition to the rotation application inclination part 344. In other words, the rotation application inclination part 344 is formed at the front portion F of the forward rail groove 341 overlapped with the rotation induction inclination part 343 formed in the backward rail groove 342, and formed at the rear portion R of the backward rail groove 342 overlapped with the rotation induction inclination part 343 formed in the forward rail groove 341.

In addition, the rotation application inclination part 344 may be inclined downward toward the bottom surface of the forward rail groove 341 or the backward rail groove 342 from the surface of the blade tilt member 340.

According to the structure of the rotation induction inclination parts 343 and 344, when the backward direction is changed to the forward direction, the rotation of the backward guider 332 inserted into the backward rail groove 342 is induced while the backward guider 332 passes through the rotation induction inclination part 343 provided at the front portion F of the backward rail groove 342, and the forward guider 331 is rotated along the rotation application inclination part 344 provided at the front portion of the forward rail groove 341. After the forward guider 331 and the backward guider 332 have passed through the rotation induction inclination part 343 and 344, respectively, the blade member 320 is revolved at 90°, so that the forward guider 331 is inserted into the forward rail groove 341, and the backward guider 332 deviates from the backward rail groove 342 so that the backward guider 332 becomes parallel to the surface of the blade tilt member 340, thereby performing a tilt operation. Accordingly, the blade plate 322 is maintained in the vertical state to the wind direction W so that the blade plate 322 continuously revolves in the forward direction.

In addition, when the forward direction is changed to the backward direction, the above operation is exactly reversely performed. The rotation of the forward guider 331 inserted into the forward rail groove 341 is induced while the backward guider 332 passes through the rotation induction inclination part 343 provided at the rear portion R of the backward rail groove 342. After the forward guider 331 and the backward guider 332 have passed through the rotation induction inclination part 343 and 344, respectively, the blade member 320 is revolved at 90° again, so that the backward guider 332 is inserted into the backward rail groove 342, and the forward guider 331 deviates from the forward rail groove 341 so that the forward guider 331 becomes parallel to the surface of the blade tilt member 340, thereby performing the tilt operation. Accordingly, the blade plate 322 is maintained in the horizontal state to the wind direction W so that the blade plate 322 continuously revolves in the backward direction.

FIG. 14(A) shows that the forward guider 331 and the backward guider 332 are rotated together by the rotation induction inclination part 343 provided at the rear portion of the forward rail groove 341 and the rotation application inclination part 344 provided at the rear portion of the backward rail groove 342 when the forward direction is changed to the backward direction as described above.

FIGS. 14(B) and 14(C) show the individual rotation of the forward guider 331 by the rotation induction inclination part 343 and the individual rotation of the backward guider 332 by the rotation application inclination part 344, respectively, for clarity.

Figure 9:
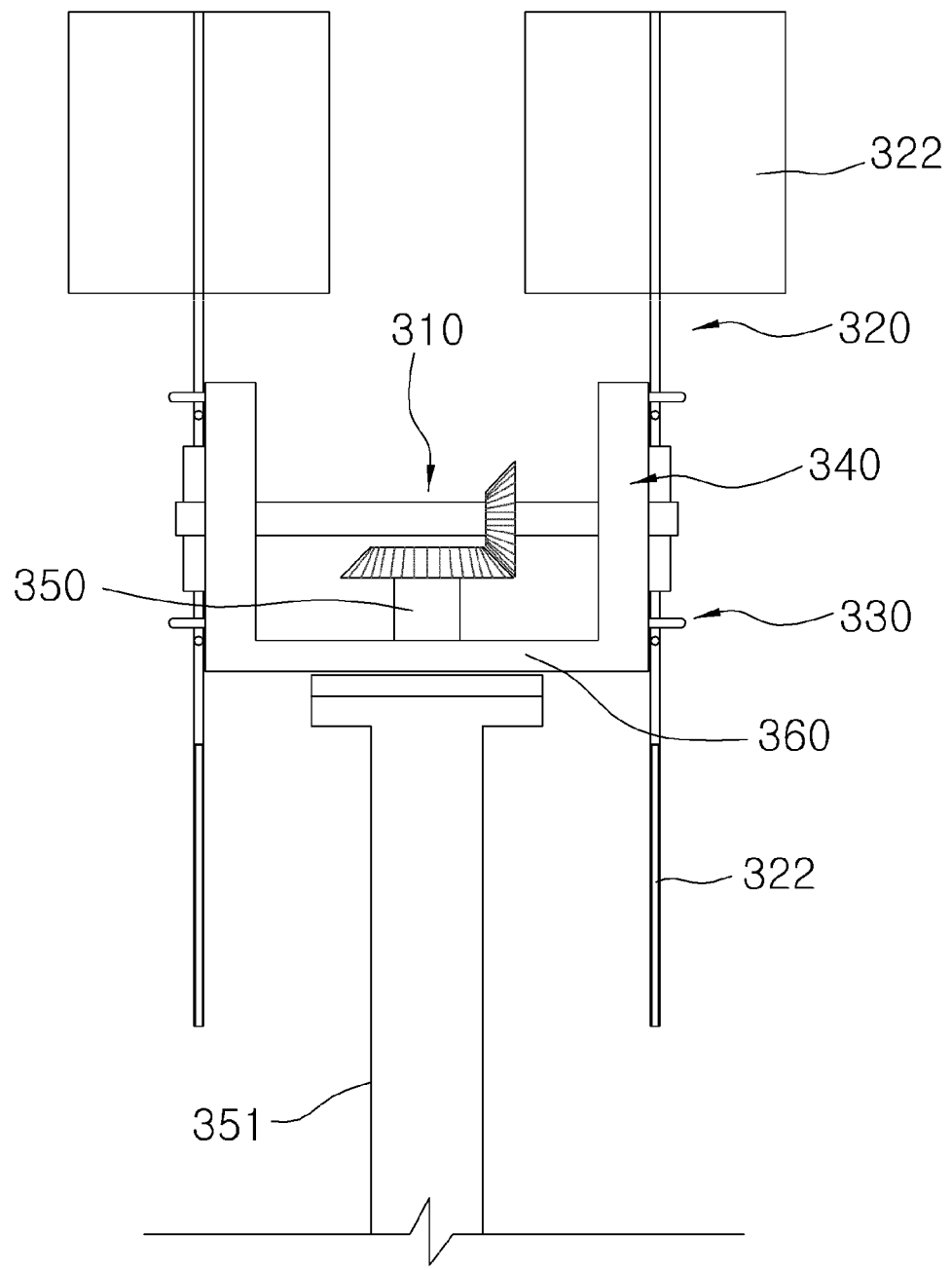
FIG. 9 is a font view showing a whole structure according to a third embodiment.
Figure 10:
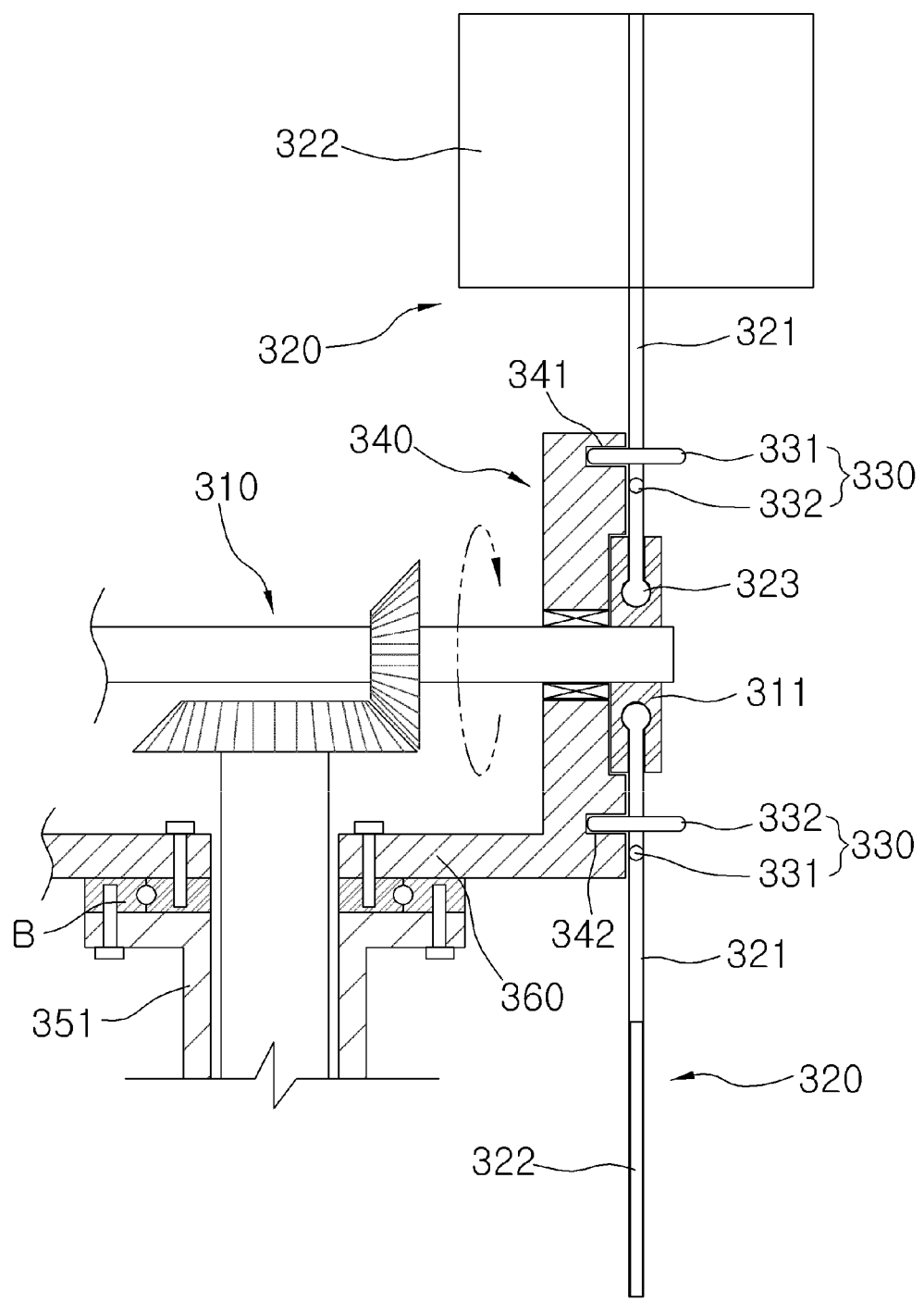
FIG. 10 is a sectional view of FIG. 9.

Meanwhile, as shown in FIG. 9, the blade members 320, the guider members 330, and the blade tilt members 340 may be paired at both sides of the horizontal rotation shaft 310 and the paired components are symmetrical to each other about the vertical power shaft 350. The vertical power shaft 350 passes through the centers of both blade tilt members 340, and both blade tilt members 340 may be fixed to the wind direction cooperation member 360 that can freely rotate according to the changes of the wind directions W.

Hereinafter, the third embodiment has been described, and the operation thereof will be described below.

When the blade member 320 revolves in the forward direction (from the front portion F to the rear portion R), the forward guider 331 protrudes vertically to the surface of the blade tilt member 340 and is guided in the state that the forward guider 331 is inserted into the forward rail groove 341 of the blade tilt member 340, and the backward guider 332 moves in parallel to the surface of the blade tilt member 340. Therefore, in the state that the self-rotation of the blade stem 321 is blocked, the blade plate 322 revolves in the forward direction while the blade plate 322 is maintained in the vertical state to the wind direction W, so that the maximum forward rotational force is applied to the horizontal rotation shaft 310.

Thereafter, as the forward revolution is performed, the forward guider 331 guided along the forward rail groove 341 reaches the rotation induction inclination part 343 formed in the forward rail groove 341. Simultaneously, the backward guider 332 reaches the rotation application inclination part 344 formed in the backward rail groove 342.

In addition, the forward guider 331 and the backward guider 332 are rotated at 90° while passing through the rotation induction inclination part 343 and the rotation application inclination part 344, respectively. Accordingly, the blade member 320 identically self-rotates at 90°, so that the blade plate 322 is tilted horizontally to the wind direction W.

Subsequently, when the blade member 320 revolves in the backward direction (from the rear portion to the front portion), the backward guider 332 is guided in the state that the backward guider 332 is inserted into the backward rail groove 342. Simultaneously, the forward guider 331 moves in parallel to the surface of the blade tilt member 340, so that the blade plate 322 revolves in the backward direction while maintaining the horizontal state to the wind direction W in the state that the self-rotation of the blade stem 321 is blocked, thereby minimizing backward resistance.

Thereafter, as the backward revolution is performed, the backward guider 332 guided along the backward rail groove 342 reaches the rotation induction inclination part 343 formed in the backward rail groove 342, and the forward guider 331 reaches to the rotation application inclination part 344 formed in the forward rail groove 341.

In addition, the backward guider 332 and the forward guider 331 are rotated at 90° again while passing through the rotation induction inclination part 343 and the rotation application inclination part 344, respectively. Accordingly, as even the blade member 320 is identically self-rotated at 90°, the blade plate 322 is tilted in the vertical state to the wind direction W.

After the direction of the blade member 320 has been changed to the forward direction, the above-described procedure is repeated, so that the blade member 320 continuously revolves by wind power while applying only the maximum forward rotational force to the horizontal rotation shaft 310.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A tilt-type rotation blade apparatus for vertical-type power generation, the tilt-type rotation blade apparatus comprising:
   a vertical power shaft;
   a wind direction cooperation member installed independently from the vertical power shaft to rotate according to change of a wind direction;
   a tilt drum vertically fixed to the wind direction cooperation member and including a rail formed along a side-outer circumference thereof;
   a blade member including a blade stem and a blade plate to revolve around the tilt drum in a horizontal direction by wind power while applying rotational force to the vertical power shaft; and
   a tilt guider having one end fixed to a center of an end of the blade stem and an opposite end installed in the rail to move along the rail when the blade member revolves,
   wherein the rail includes a forward rail part and a backward rail part having a linear shape, bi-directionally spaced apart from a revolution path of the blade member by an equal distance, alternately formed at an interval of 180°, and linked with each other by one pair of switching rail parts having an oblique shape, and
   the tilt guider moves along the forward rail part such that the blade plate becomes vertical to the wind direction when the blade member revolves in a forward direction of the blade member, which is identical to the wind direction, moves along the backward rail part such that the blade plate becomes horizontal to the wind direction when the blade member revolves in a backward direction, which is opposite to the wind direction, and passes through the switching rail parts to allow the blade member to self-rotate at an angle of 90° such that the blade plate is tilted vertically or horizontally to the wind direction.

2. The tilt-type rotation blade apparatus of claim 1, further comprising a blade support member fixed on the vertical power shaft to rotate together with the vertical power shaft and including a stem support pipe,
   wherein the blade member is self-rotatably installed on the blade support member as the blade stem passes through the stem support pipe.

3. The tilt-type rotation blade apparatus of claim 1, wherein the tilt guider forms an angle of 45° with respect to the blade plate.

4. The tilt-type rotation blade apparatus of claim 1, further comprising a rail roller provided at the opposite end of the tilt guider installed in the rail to rotate along the rail when the blade member revolves.

5. A tilt-type rotation blade apparatus for vertical-type power generation, which applies rotational force generated by wind power to a vertical power shaft of a vertical wind power turbine, the rotation blade apparatus comprising:
   a horizontal rotation shaft geared with the vertical power shaft and having a shaft line vertical to a wind direction and horizontal to a ground surface;
   a blade member including a blade stem self-rotatably installed on the horizontal rotation shaft and a blade plate fixed to the blade stem to revolve around the horizontal rotation shaft by wind blowing from a front side such that the rotational force is applied to the horizontal rotation shaft;
   a guider member including a forward guider formed on the blade stem to protrude in a horizontal direction to a plane surface of the blade plate and a backward guider protruding in a vertical direction to the plane surface of the blade plate; and
   a blade tilt member including a forward rail groove into which the forward guider is inserted such that the forward guider is guided along the forward rail groove when the blade member revolves in a forward direction, which is identical to the wind direction, from a front side to a rear side, a backward rail groove into which the backward guider is inserted such that the backward guider is guided when the blade member revolves in a backward direction, which is opposite to the wind direction, from a rear side to the front side, and rotation induction inclination parts formed at a rear position of the forward rail groove and at a front portion of the backward rail groove, respectively, to induce rotations of the forward guider and the backward guider, which are guided, and to allow the blade member to revolve at an angle of 90°, such that the plane surface of the blade plate becomes vertical to the wind direction when the blade member revolves in the forward direction, and becomes horizontal to the wind direction when the blade member revolves in the backward direction;
   wherein the forward and backward rail grooves are concentrically formed in arc shapes symmetrical to each other at upper and lower sides of the horizontal rotation shaft, respectively; and
   the rotation induction inclination part is inclined in a streamline shape upward from a bottom surface of the forward rail groove or the backward rail groove, and provided at a lower end thereof with a locking step.

6. The rotation blade apparatus of claim 5, further comprising rotational application inclination parts formed at a front portion of the forward rail groove and a rear portion of the backward rail groove and inclined downward in opposition to the rotation induction inclination parts, respectively, to allow the backward guider or the forward guider to rotate together with a corresponding forward guider or a corresponding backward guider when the corresponding forward guider or the corresponding backward guider rotates by each rotation induction inclination part.

7. A tilt-type rotation blade apparatus for vertical-type power generation, the tilt-type rotation blade apparatus comprising:
   a vertical power shaft;
   a wind direction cooperation member installed independently from the vertical power shaft to rotate according to change of a wind direction;
   a horizontal rotation shaft coupled to the vertical power shaft for power transmission and horizontally passing through the wind direction cooperation member;
   a tilt drum horizontally fixed to the wind direction cooperation member and including a rail formed along a side-outer circumference thereof;

a blade member including a blade stem and a blade plate to revolve around the tilt drum in a vertical direction by wind power while applying rotational force to the horizontal power shaft; and a tilt guider having one end fixed to a center of an end of the blade stem and an opposite end installed in the rail to move along a track of the rail when the blade member revolves, wherein the rail includes a forward rail part and a backward rail part having a linear shape, bi-directionally spaced apart from a revolution path of the blade member by an equal distance, alternately formed at an interval of 180°, and linked with each other by one pair of switching rail parts having an oblique shape, and the tilt guider moves along the forward rail part such that the blade plate becomes vertical to the wind direction when the blade member revolves in a forward direction of the blade member, which is identical to the wind direction, moves along the backward rail part such that the blade plate becomes horizontal to the wind direction when the blade member revolves in a backward direction, which is opposite to the wind direction, and passes through the switching rail parts to allow the blade member to self-rotate at an angle of 90° such that the blade plate is tilted vertically or horizontally to the wind direction.

8. The tilt-type rotation blade apparatus of claim 7, further comprising a blade support member fixed on the horizontal rotation shaft to rotate together with the horizontal rotation shaft and including a stem support pipe, wherein the blade member is self-rotatably installed on the blade support member as the blade stem passes through the stem support pipe.

9. The tilt-type rotation blade apparatus of claim 7, wherein the tilt guider forms an angle of 45° with respect to the blade plate.

10. The tilt-type rotation blade apparatus of claim 7, further comprising a rail roller provided at the opposite end of the tilt guider installed in the rail to rotate along the rail when the blade member revolves.

* * * * *